United States Patent [19]
Grey et al.

[11] 3,795,327
[45] Mar. 5, 1974

[54] SINGLE BALE UNLOADING CONTROL SYSTEM

[75] Inventors: Donald M. Grey, Selma; Albert C. Cook; Lee D. Butler, both of Kingsburg, all of Calif.; Raymond E. Fisher, Lancaster, Pa.

[73] Assignees: Sperry Rand Corporation, New Holland, Pa.; Sperry Rand Corporation, New Holland, Pa.CC 3003; 1 Sermar; Frank A.

[22] Filed: Apr. 3, 1972

[21] Appl. No.: 240,682

[52] U.S. Cl............................ 214/8.5 G, 214/8.5 SS
[51] Int. Cl............................................. B65g 17/06
[58] Field of Search 214/8.5 R, 8.5 K, 8.5 G, 8.5 A, 214/8.5 FF, 6 B, 8.5 SS

[56] References Cited
UNITED STATES PATENTS
3,502,230   3/1970   Grey et al. .......................... 214/6 B
3,631,992   1/1972   Dickinson .......................... 214/6 B Primary Examiner—Robert J. Spar
Assistant Examiner—Kenneth Noland
Attorney, Agent, or Firm—Frank A. Seemar; John R. Flanagan; Joseph A. Brown

[57] ABSTRACT

A single bale unloading control system for controlling a plurality of bale separating hooks associated with an unloading table of a single bale unloading bale wagon. The single bale unloading control system of the present invention comprises a hydraulic cylinder operatively connected to a rockshaft transversely journalled on the underside of the unloading table, the rockshaft having secured thereto in lateral spaced apart relationship the bale separating hooks which are aligned to move through openings formed in the unloading table. The unloading table is further provided with a transverse cross conveyor that is adapted to convey a single separated layer of a tier from the unloading table. The hydraulic cylinder used for actuating the bale separating hooks is controlled by a control valve that is actuated by a connecting linkage that is responsive to the movement of the cross conveyor.

11 Claims, 9 Drawing Figures

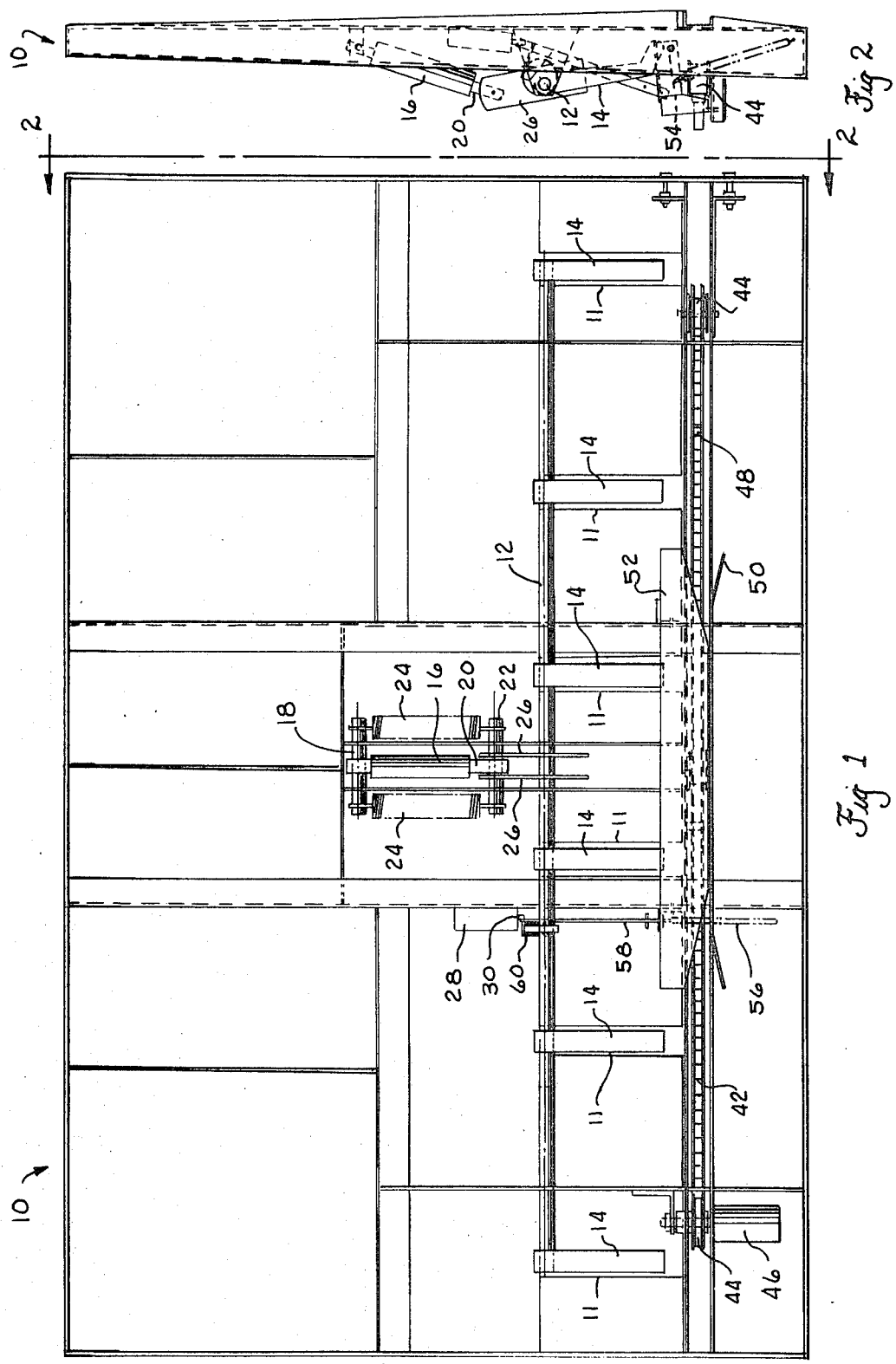

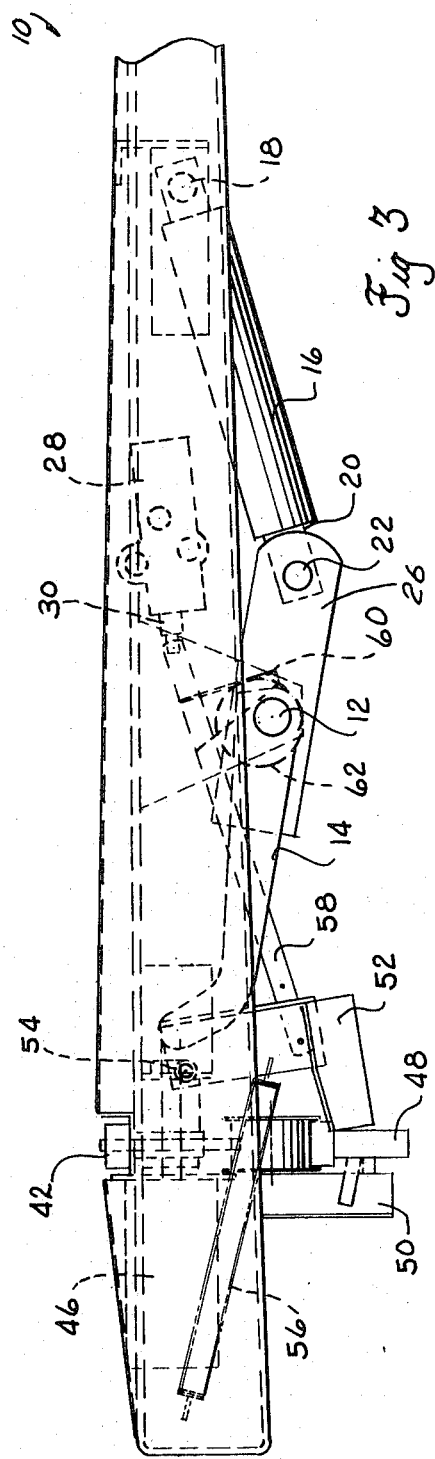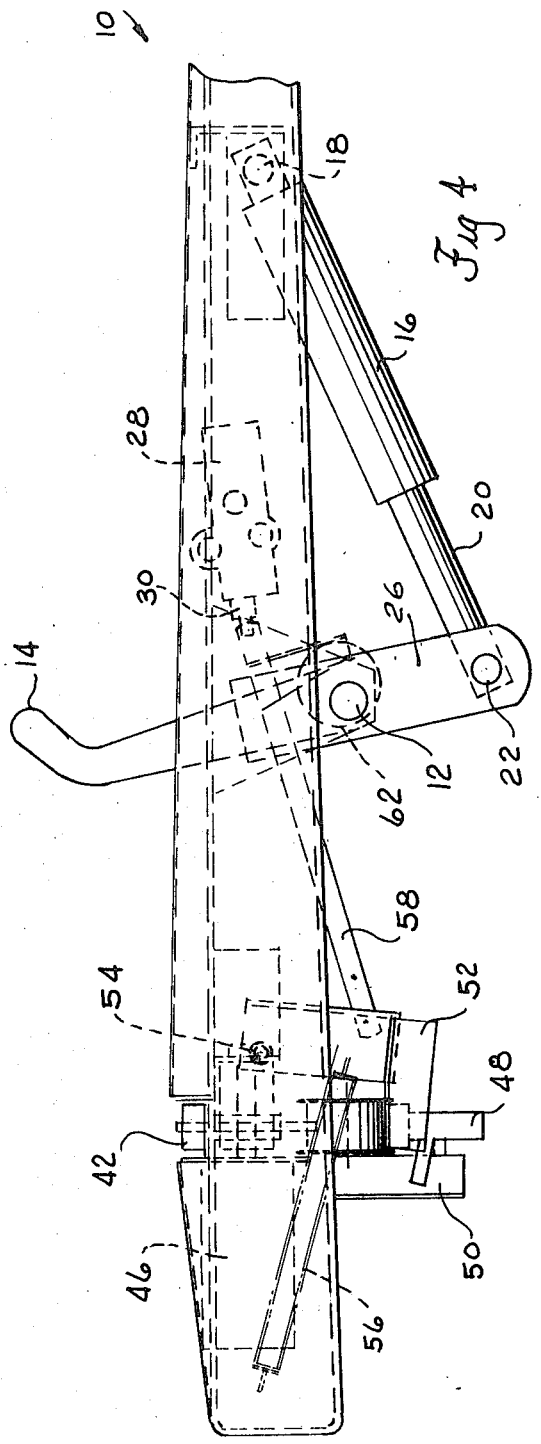

SINGLE BALE UNLOADING CONTROL SYSTEM

BACKGROUND OF THE INVENTION

The present invention relates to bale wagons of the single bale unloading type, and more particularly to a control system for controlling the single bale unloading operation from an unloading table.

One of the most basic principles to evolve thus far in single bale unloading relates to tier separation, the principle of tier separation meaning that a portion of the tier being unloaded is separated from another portion such that the latter portion may be conveyed from an inclined unloading table without interference from the former portion. To accomplish tier separation, the present state of the art teaches the use of bale separating hooks that are normally disposed below the unloading table and are actuated up through openings formed therein to engage a portion of the tier disposed thereon and shift that portion away from another portion that generally overlies a cross conveyor. Once this has transpired, the portion of the tier overlying the cross conveyor can then be conveyed from the unloading table without interference from the above tier portion. After this tier portion has been conveyed from the unloading table it is then necessary to actuate the bale separating hooks back to a down position, allowing the above tier portion to slide down the unloading table such that another portion overlies the cross conveyor. Once the complete tier portion has moved down the unloading table, it is then necessary to actuate the bale separating hooks once again such that another tier portion is separated from the tier portion overlying the cross conveyor.

One of the most troublesome problems in attempting to implement the tier separation principle is that of devising a control system for the bale separating hooks that results in each tier being unloaded in an orderly and efficient manner. The present control system being commercially employed today corresponds to that shown and described in U. S. Pat. No. 3,610,440 and is commonly referred to as a shuttle latch control system for single bale unloading. From a review of this patent (U. S. Pat. No. 3,610,440) it will be observed that the bale separating hooks are generally controlled in time relationship relative to the cross conveyor. In particular, the power gained for actuating the bale separating hooks is derived from the cross conveyor, and further that the bale separating hooks are actuated by a mechanical linkage that is moved back and forth by a shuttle which engages a latch to hold the bale separating hooks in an up position. To release the bale separating hooks and allow the portion of the tier being held thereby to slide down the unloading table, the cross conveyor includes a pair of laterally spaced paddles and these paddles are particularly adapted to trip the latch. Since the mechanical linkage is spring biased to normally return the bale separating hooks to the down position, the tripping of the latch results in the bale separating hooks being returned to the down position below the unloading table. But almost instantaneously after the shuttle has been released by the latch it once again engages the cross conveyor which results in the bale separating hooks to be actuated towards their up tier engaging position, thereby providing a relatively short "down time" for the bale separating hooks and consequently providing on minimal time for the tier to slide down the unloading table before a portion thereof is once again raised by the bale separating hooks.

Moreover, it will be appreciated from studying the above discussed single bale unloading control system that the cross conveyor therein is only adapted to cycle in one general direction. Thus, signal bale unloading can only be performed from one side of the bale wagon. And likewise the control linkage for actuating the bale separating hooks is only operative when the cross conveyor is driven in the one direction. In fact, the very design of the control linkage limits its operativeness to a single cross conveyor direction.

SUMMARY OF THE INVENTION

Applicants have devised a novel single bale unloading control system for effectuating tier separation and single bale unloading from the unloading table of a bale wagon. Generally, applicants' single bale unloading control system comprises a hydraulic cylinder for powering the bale separating hooks associated with an unloading table disposed on the bale wagon, a control valve operatively connected to said hydraulic cylinder, and a control linkage operatively connected to the control valve and responsive in part to the movement of a cross conveyor on said unloading table for actuating said control valve and consequently controlling the position of the bale separating hooks with respect to the unloading table.

It is therefore the principal object of the present invention to provide a new and improved control system for controlling tier separation and single bale unloading.

It is a further object of the present invention to provide a simple, reliable, relatively inexpensive, and smooth and orderly operating control system for controlling single bale unloading from an unloading table of a bale wagon.

In a bale wagon having a single bale unloading table adapted to unload a tier comprised of a plurality of layers disposed in side-by-side relationship and particularly including a plurality of bale separating hooks for separating a portion of the tier from a single layer, and further including a cross conveyor for conveying the single separated layer from the unloading table, it is a further object of the present invention to provide the single bale unloading table with a hydraulic control system for controlling the position of the bale separating hooks in relationship to the timed movement of the cross conveyor.

In particular, it is the object of the present invention to provide a hydraulic cylinder for actuating a plurality of bale separating hooks secured on a transversely extending rockshaft, a control valve for selectively diverting fluid to and from said hydraulic cylinder and a control linkage operatively connected to said control valve and responsive to the movement of the cross conveyor for selectively actuating said control valve and consequently controlling the bale separating hooks in response to the movement of the cross conveyor.

Another object of the present invention resides in the provision of a single bale unloading control system that increases the "down time" (non-engaged) of the bale separating hooks, thereby allowing the remaining tier portion to slide down the inclined unloading table and settle into place before another portion thereof is separated.

A further object of the present invention is to provide a control system for the single bale unloading table of a bale wagon which utilizes an independent external power source for powering the bale separating hooks and which does not depend on the secondary power of a cross conveyor primarily used for single bale unloading.

A still further object of the present invention resides in the provision of a control valve and a control linkage responsive to the periodic cycling of a cross conveyor for actuating said control valve such that fluid is directed into the anchor end of a single acting hydraulic cylinder for powering the bale separating hooks from a down non-engaged position to an up tier engaged position, and wherein control means, completely independent of the cross conveyor, is further provided for partially shifting said control valve in response to the movement of said bale separating hooks to the up position such that substantial back pressure is created within the control valve and acts against the single acting hydraulic cylinder to maintain the bale separating hooks in the up position while allowing flow into the valve to return to a reservoir.

Another object of the present invention is to provide a single bale unloading table with a cross conveyor operatively disposed therein for conveying individual layers of the tier from the unloading table, and wherein means for driving said cross conveyor and control means for driving said cross conveyor in either of two directions is provided such that bales may be unloaded from either side of the unloading table one bale at a time.

It is a further object of the present invention to provide a single bale unloading control system for an unloading table of a bale wagon that is particularly adapted to control the single bale unloading operation irrespective of the direction in which the cross conveyor is driven.

Other objects and advantages of the present invention will become apparent and obvious from a study of the following description and the accompanying drawings which are merely illustrative of the present invention.

BRIEF DESCRIPTION OF THE DRAWINGS

FIG. 1 is a plan view of the underside of a single bale unloading table showing particularly the single bale unloading control system of the present invention.

FIG. 2 is a side view of the single bale unloading table and single bale unloading control system taken along the line 2—2 of FIG. 1.

FIGS. 3 and 4 are enlarged side elevational views of the single bale unloading table and the control system therefore.

DESCRIPTION OF THE PREFERRED EMBODIMENT

Figure 5:
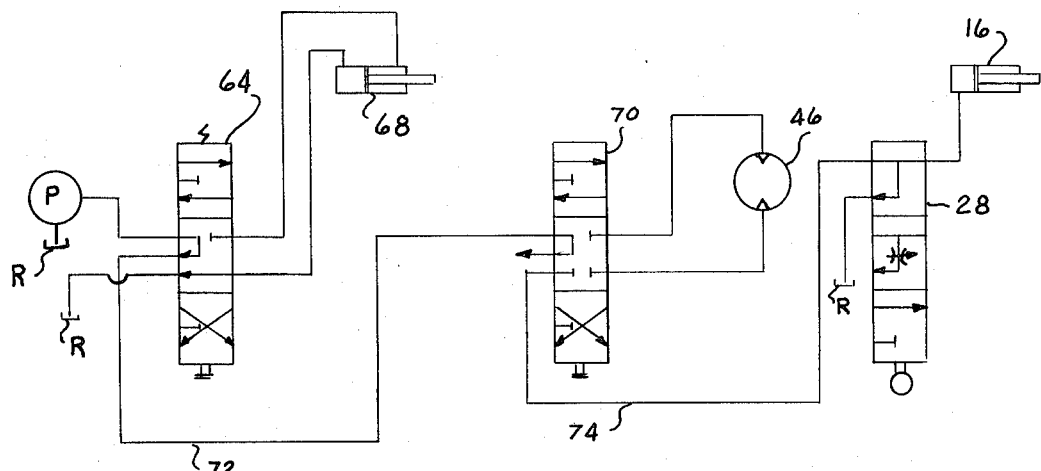
FIG. 5 is a fragmentary hydraulic circuitry diagram, particularly illustrating numerous circuitry components forming a part of the total single bale unloading control system.

With particular reference to the drawings, particularly FIGS. 1-4, a single bale unloading table is shown therein and generally indicated by the numeral 10. The unloading table 10 is of the type adapted to be employed in single bale unloading bale wagons of the type shown and described in a concurrently filed U. S. Pat. application (Ser. No. 240,472) entitled "Bale Wagon," invented by Albert C. Cook, Donald M. Grey and Raymond E. Fisher, the subject matter and disclosure of this concurrently filed patent application being hereby incorporated by reference into the present application.

Viewing FIG. 1, it is seen that the single bale unloading table 10 includes a plurality of laterally spaced generally rectangular shaped openings 11 formed therein. Rotatively mounted transversely the underside of the table 10 is a rockshaft 12 that has fixed thereon a plurality of bale separating hooks 14 being particularly spaced to correspond to the spacing of the openings 11 such that upon rotation of the rockshaft 12 the bale separating hooks 14 can move from a down non-engaged position, through the openings 11, to an up tier engaging position (FIG. 4). To actuate the rockshaft 12 and consequently the bale separating hooks 14, a hydraulic cylinder 16 is provided and is particularly disposed such that one end is anchored to the underside of the table 10 by a cross shaft 18. The hydraulic cylinder includes a rod 20 extending generally downwardly (as viewed in FIG. 1) towards the rockshaft 12 and, as best seen in FIG. 1, the rod 20 includes a second cross shaft 22. Interconnected between cross shafts 18, 22 on each side of the hydraulic cylinder 16 is a tension spring 24 which biases the rod 20 of the hydraulic cylinder 16 to a retracted position. The rockshaft 12 and rod 20 are interconnected by a pair of connecting plates 26. Therefore upon actuation of the hydraulic cylinder 16, the rod 20 thereof is extended causing the rockshaft 12 to rotate and consequently the bale separating hooks 14 to move from their down position to their up position. As will be described in greater detail subsequently, once pressure is relieved from the anchor end of the hydraulic cylinder 16 the springs then tend to bring the rod 20 back to the retracted position, as shown in FIG. 1 and 3, the retracted position corresponding to the down or non-engaged position of the bale separating hooks.

Stationed on the underside of the table 10 is a conventional multi-positional control valve 28 that is particularly adapted to control the flow of fluid to and from the anchor end of hydraulic cylinder 16. Briefly, referring to FIGS. 7-9, it will be seen that control valve 28 includes a body structure housing and a slideable spool 30 that may be selectably actuated back and forth within the body of the valve.

Furthermore, valve 29 includes three operative ports, an "in" port, an "out" port and a "work" port 36 that, as will be evident from the foregoing disclosure, leads to the anchor end of hydraulic cylinder 16. Although the "in" and "out" ports are not particularly shown in relationship to the outer surface of the valve body 28, it will be noted from FIGS. 7-9 that surrounding the spool 30 is an "in" cavity 32 which joins the "in" port and a pair of "out" cavities 34,35 which join the "out" port. Also, control valve 28 includes a short passage 38 generally disposed adjacent the "in" cavity 32 and a curved passage 40 that leads from the short passage 38 and is operative to direct fluid to the work port 36.

Returning to a description of the unloading table 10 and the single bale unloading control system therefor, as best seen in FIGS. 1–4, it is noted that a cross conveyor 42 is spaced generally below the bale separating hooks 14, and in particular is trained around a pair of laterally spaced rotatively mounted sprockets 44. As viewed in FIG. 1, the left sprocket 44 is driven by a hydraulic orbit motor 46, the left sprocket 44 in turn driving the cross conveyor 42. Cross conveyor 42 has extending outwardly therefrom a pair of spaced apart paddles, each being denoted by the numeral 48. During the single bale unloading operation the paddles 48, among other things, engage a single layer of a tier that has been separated from the other portion of the tier and conveys the single layer from the unloading table.

In accordance with the present invention the control valve 28 and consequently the hydraulic cylinder 16 is directly controlled in part by the movement of the cross conveyor 42. In particular, the unloading table 10 includes a control linkage structure that is selectively engageable with the paddles 48 and responsive thereto for shifting spool 30 of control valve 28. The control linkage structure comprises a stationary guide plate 50 disposed on the underside of the unloading table adjacent the lower edge (as viewed in FIG. 1) of the cross conveyor 42. Disposed opposite the stationary guide plate 50 is an actuator plate 52 that is pivotally mounted about a transverse axis 54 and is biased to normally abut against the stationary guide plate by a spring 56. It will observed from FIG. 1 that in the normal bias position, the actuator plate 52 assumes a position in the path of the paddles 48. Also, it is observed that the outer opposite ends of both the stationary plate 50 and actuator plate 52 are generally tapered outwardly from the cross conveyor such that the paddles may enter and exit therebetween in a smooth and gentle manner. Interconnecting the actuator plate 52 and the control valve spool 30 is a connecting link 58. Thus, the movement of the actuator plate by the paddles 48 and spring 56 causes the spool 30 to be shifted within control valve 28.

To provide a further control for valve 28 that is not directly dependent on the movement of the paddles 48, the present disclosure includes a cam following bracket 60 fixed to the connecting link 58 in the general vicinity of the rockshaft 12. Aligned with the cam following bracket 60 and secured to the rockshaft 12 is a cam 62 which functions to partially shift the valve from the position assumed when the actuator plate 54 abuts against the stationary guide plate 50. Therefore, it is seen that the partial shifting of the valve 28 does not take place until the bale separating hooks have generally reached the up or tier engaging position.

Turning to FIG. 5, a hydraulic circuitry diagram is shown therein showing the basic hydraulic components for carrying out the single bale unloading operation for a bale wagon of the general single bale unloading type. Generally, fluid is directed to a central single bale unloading control valve 64 from a pump P. Control valve 64 is adapted to actuate a rolling rack through a double acting hydraulic cylinder 68 to cause a tier at a time to be moved from the load bed of a conventional three table bale wagon onto the unloading table 10 shown particularly in the present disclosure. In the spring centered position, as shown in FIG. 5, control valve 64 directs fluid from the pump P to a power beyond line 72 which leads to control valve 70, control vlave 70 being operatively connected to the cross conveyor orbit motor 46 for controlling the same. In the normal spring centered position control valve 70 diverts fluid back into other parts of the hydraulic circuitry, not shown, that are immaterial to single bale unloading. However, in either the top or bottom position, as viewed in FIG. 5, control valve 70 is operative to divert flow into either side of the cross conveyor orbit motor 46. When operating the orbit motor 46 fluid always returns from the motor and enters line 74 that leads into the "in" port of the control valve 28. Thus, it is seen that at any time in which the cross conveyor motor 46 is being actuated, fluid is also being diverted to control valve 28.

Figure 7:
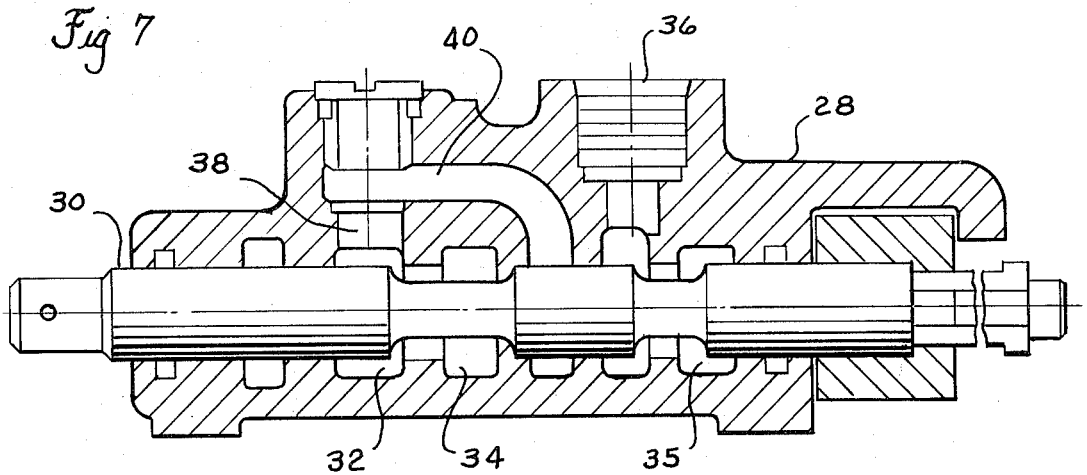
FIGS. 7-9 are a series of sectional views of a conventional multi-positional control valve for actuating the bale separating hooks of the single bale unloading control system of the present invention.

Referring to control valve 28 and its operative relationship with hydraulic cylinder 16 and the bale separating hooks 14, it will be observed that in the top position, as viewed in FIG. 5, flow is directed into the "in" port and back to reservoir R. Also, in this top position any fluid that may be in the anchor end of hydraulic cylinder 16 may also be returned to the reservoir R because of the retracting force applied to the rod 20 by springs 24. This top position, as viewed in FIG. 5, is achieved when the actuator plate 54 is spaced from the stationary guide plate 50 by the presence of the paddles 48 therebetween. When the actuator plate 52 is spaced from stationary plate 50 (FIG. 3) it is seen that the connecting link 58 pushes spool 30 to its innermost position, as shown in FIG. 7. With particular reference to FIG. 7, it is seen that fluid may enter the "in" port and move from the "in" cavity 32 to the "out" cavity 34 where the fluid returns to reservoir.

Figure 9:
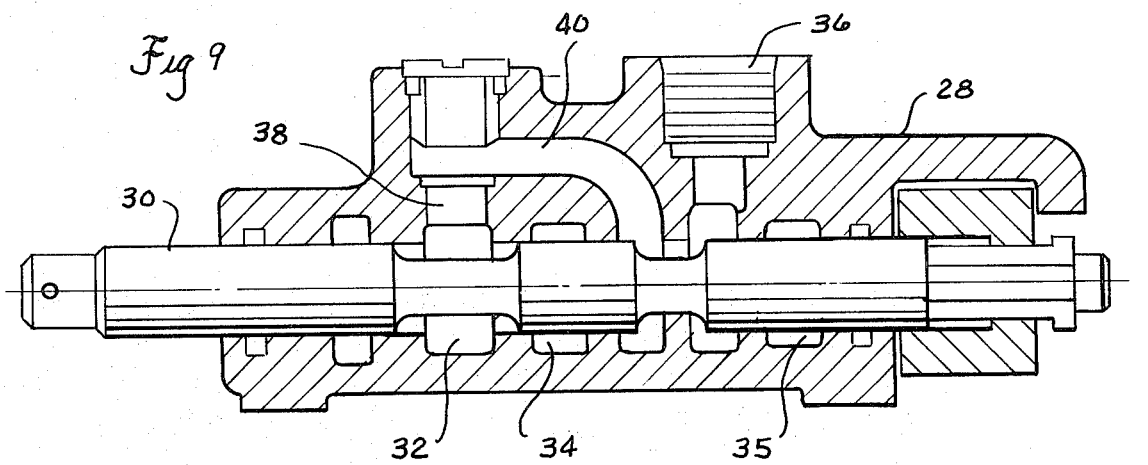

Once the paddles 48 have moved from between the actuator plate 52 and the stationary plate 50, spring 56 causes the actuator plate 52 to abut against stationary guide plate 50. The abutment of the actuator plate 52 with stationary guide plate 50 causes the connecting link 58 to extend spool 30 to its outermost position as shown in FIG. 9. In the outermost position fluid directed into the "in" port is directed through "in" cavity 32, through short passage 38, and into curved passage 40. Since both "out" cavities 34,35 are blocked the flow of fluid is constrained to move into the anchor end of hydraulic cylinder 16 causing the rod 20 to be extended and consequently the bale separating hooks 14 to move from their down non-engaged position to their up tier engaging position.

Figure 8:
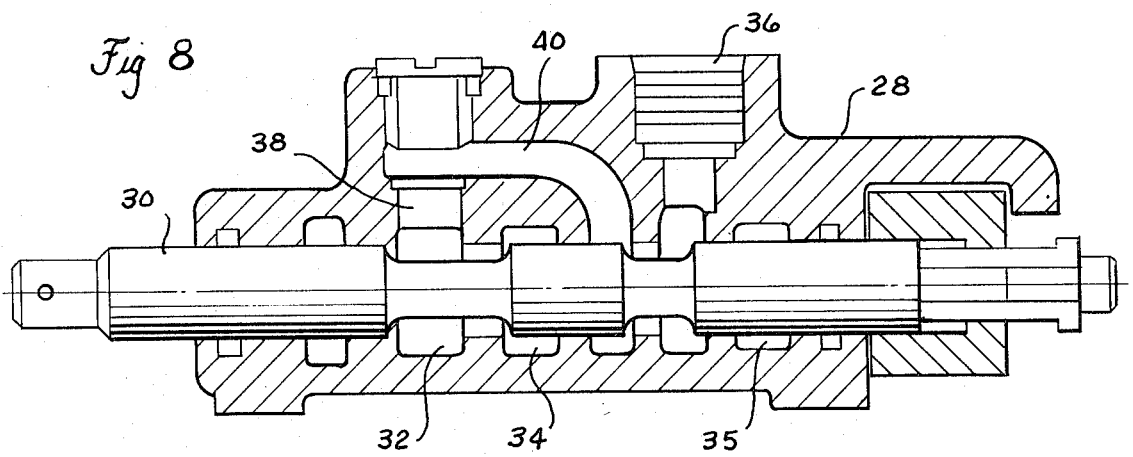

As the bale separating hooks 14 reach the tier engaging position, the cam 62 stationed on the rockshaft 12 has engaged cam following bracket 60, causing spool 30 to be shifted partially inwardly, as shown in FIG. 8. In this partial shifted position one can see that pressure is maintained at the work port 36 maintaining the bale separating hooks in the tier engaging position while the flow of fluid into the "in" port is orificed from the "in" cavity 32 to the "out" cavity 34 and on out the "out" port. Thus, valve 28 in this partially shifted position acts as a metering device as inherently the spool 30 reaches a position that will maintain substantial pressure to keep the bale separating hooks up while allowing the flow thereto to be diverted back to the reservoir R. It should be particularly pointed out that by the use of the cam and the cam following bracket in conjunction with the spring biased actuator plate 52, the total control system becomes self-compensating as the cam tends to move the spool inwardly and the actuator plate being spring biased tends to extend the spool. But in the end, the spool 30 always reaches a position that will maintain enough pressure at the work port 36 to maintain the bale separating hooks in the up tier engaging position.

Therefore, it is seen that the present single bale unloading hydraulic control system has many advantages inasmuch as it is simple, reliable and operates in a smooth and orderly fashion. One point that may particularly be emphasized is that the present single bale unloading control system provides for a substantial "down time" during the cycling of the cross conveyor 42 as the bale separating hooks are maintained in the down position while the actuator plate 52 is separated from the stationary guide plate by the presence of the paddles 48 for a significant period of a given cycle of the cross conveyor.

Figure 6:
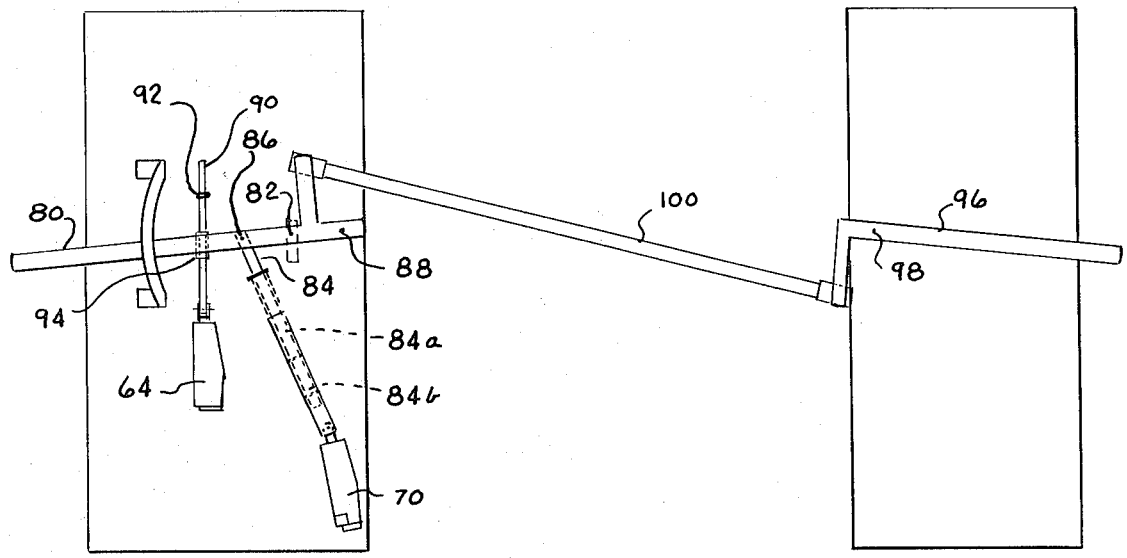
FIG. 6 illustrates the manual control handles for initiating the single bale unloading operation.

Turning briefly to FIG. 6, the manual control system for controlling the single bale unloading operation is shown therein. In particular this control system comprises a control handle 80 pivotally mounted about pivot axis 82. Central control valve 64 and cross conveyor control valve 70 are mounted adjacent the control handle 80. Control handle 80 is operatively connected to the spool of the cross conveyor valve 70 by a connecting link 84 which includes a pair of overrunning springs 84a,84b which allow the control handle 80 to be continued to be moved once the cross conveyor valve has been actuated. Of particular importance in this disclosure is the fact that the connecting link 84 may be selectively connected to control handle 80 at either of two connecting points 86,88. These two connecting points are spaced on opposite sides of the pivot axis 82, and therefore by changing the point of connection, the spool of the cross conveyor control valve can be actuated in either of two directions while still only moving the control handle 80 in one general direction. The linkage for actuating the central control valve 64 comprises a rod 90 operatively connected to the spool of the control valve and further including a stop 92 fixed thereon. Slideably contained on the rod 90 is a collar 94 that is fixed to control handle 80. Thus, since central control valve 64 is spring centered one can actuate the valve by simply stroking the control handle 80 such that the collar 94 engages stop 92 causing the spool of valve 64 to be shifted. In order to control the single bale unloading operation from either side of the bale wagon, a second control handle 96 is pivotally mounted about axis 98 and connected to the other handle 80 by an interconnecting link 100.

The terms, "upper," "lower," "forward," "rearward" etc. have been used herein merely for the convenience of the foregoing specification and in the appended claims to describe the single bale unloading control system and its parts as oriented in the drawings. It is to be understood, however, that these terms are in no way limiting to the invention since the single bale unloading control system may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. In a single bale unloading bale wagon having a wheel supported chassis structure; a load bed mounted on said chassis structure and adapted to support a stack of bales comprised of a plurality of tiers disposed in side-by-side relationship, each tier including a series of layers disposed in side-by-side relationship, an unloading table disposed adjacent said load bed; means for transferring a tier at a time from said load bed to said unloading table; a plurality of moveably mounted bale separating hooks associated with said unloading table and operative to move between a normal non-engaged position to an engaged position where the bale separating hooks act to separate a portion of the particular tier disposed on the loading table from a single layer; a cross conveyor operatively associated with said unloading table for conveying the separated single layer from either side of the unloading table; and means for driving said cross conveyor; the improvement comprising a hydraulic control system for selectively actuating said bale separating hooks in response to the movement of said conveyor, said hydraulic control system comprising:

a. a hydraulic cylinder operatively connected to said bale separating hooks;

b. a control valve operatively connected to said hydraulic cylinder for selectively directing fluid to and from said cylinder;

c. actuating means carried by said cross conveyor; and d. a control linkage operatively connected to said valve and engageable with said actuating means for actuating said control valve and consequently said hydraulic cylinder in response to the movement of said cross conveyor.

2. A hydraulic control system for the bale separating hooks of a single bale unloading bale wagon, as recited in claim 1, wherein said actuating means includes a pair of laterally spaced paddles carried by said cross conveyor; and wherein said control linkage includes an actuator plate moveably mounted adjacent said cross conveyor and biased for engagement with said paddles, whereby said actuator plate is moved by the engagement and disengagement of said paddles with said actuator plate; and a connecting link interconnected between said actuator plate and said control valve, whereby said actuator plate actuates said control valve in response to the engagement and disengagement of said paddles therewith.

3. A hydraulic control system for the bale separating hooks of a single bale unloading bale wagon, as recited in claim 2, wherein said bale separating hooks are fixed to a rockshaft, and wherein said control linkage includes a cam following mechanism fixed to said connecting links, and a cam fixed to said rockshaft and particularly adapted to engage said cam following mechanism in response to the movement of said bale separating hooks and said rockshaft, thereby actuating said control valve independently of said cross conveyor and said actuator plate.

4. A hydraulic system for controlling the bale separating hooks of a single bale unloading bale wagon, as recited in claim 3, wherein said hydraulic cylinder is of the single acting type and includes spring means for returning the hydraulic cylinder to the retracted position.

5. A hydraulic control system for controlling tier separation and single bale unloading on an unloading table of a bale wagon comprising in combination: an unloading table having a series of laterally spaced openings formed therein; said unloading table adapted to support a tier of bales having a series of layers disposed in side-by-side relationship; a rockshaft transversely journalled about said unloading table; a plurality of laterally spaced bale separating hooks secured to said rockshaft and normally disposed in a non-engaging position generally below said unloading table, said rockshaft and bale separating hooks being particularly spaced such that upon actuation of said rockshaft said bale separating hooks move from the normal non-engaged position, through said openings, to a tier engaging position generally above said unloading table where said bale separating hooks act to engage and separate a portion of the respective tier disposed on the unloading table from a single layer; a cross conveyor mounted on said unloading table and spaced relative to said bale separating hooks for engaging and conveying the single separated layers; a single acting hydraulic cylinder anchored at one end to said unloading table and including a piston with a rod extending from the other end, said rod being operative to actuate said bale separating hooks between said non-engaged position and said tier engaged position; spring means for biasing said piston and rod to a retracted position within said hydraulic cylinder; a multi-position hydraulic control valve operatively connected to the anchor end of said single acting hydraulic cylinder, said control valve adapted to selectively allow fluid to exit from the cylinder in one position, direct fluid under pressure into the anchor end of the cylinder against the piston in a second position causing the bale separating hooks to move from the non-engaging position to the tier engaging position, and further adapted in a third position to maintain pressure against the piston once the bale separating hooks are in the tier engaging position such that the hooks maintain a portion of the tier in a separated relationship relative to the single layer being conveyed from the unloading table; a pair of laterally spaced paddles carried by said cross conveyor; an actuator plate moveably mounted adjacent said cross conveyor, said actuator plate being biased to assume a normal first position in the path of said paddles and moveable to a second position in response to the engagement of said paddles therewith; a connecting link interconnecting said actuator plate and said control valve, whereby said control valve is shifted between the first and second positions in response to the movement of said actuator plate between the first and second positions; and means responsive to the bale separating hooks reaching the tier engaging position for shifting said control valve to said third position and maintaining said bale separating hooks in the tier engaging position.

6. A hydraulic control system for the unloading table of a single bale unloading bale wagon, as recited in claim 5, wherein said means responsive to the bale separating hooks reaching the tier engaging position for shifting said control valve to said third position includes a cam following mechanism secured to said connecting link and a cam fixed to said rockshaft and particularly phased thereon for engagement with said cam following mechanism as said rockshaft is actuated by said single acting hydraulic cylinder, whereby the engagement of said cam with said cam following mechanism causes said connecting link to be moved which in turn results in the control valve being shifted to said third position.

7. A hydraulic control system for the unloading table of a single bale unloading bale wagon, as recited in claim 6, wherein the third position of said control valve is obtained by partially shifting said control valve from the second position, and wherein the partial shifting of the control valve from the second position results in the flow of fluid through the control valve being restricted, thereby causing a back pressure against the piston of said single acting hydraulic cylinder and causing the bale separating hooks to be maintained in the tier engaging position.

8. A hydraulic control system for controlling tier separation and single bale unloading on an unloading table of a single bale unloading bale wagon comprising in combination: an unloading table; a cross conveyor moveable mounted within said unloading table; means for driving said cross conveyor; a first control means operatively connected to said driving means for selectively driving said cross conveyor in either of two directions such that bales may be conveyed from either side of the unloading table; bale separating hooks moveably mounted adjacent said unloading table and moveable from a non-engaging position to a tier engaging position; a hydraulic cylinder operatively connected to said bale separating hooks for moving said hooks from said non-engaging position to said tier engaging position; a control valve for directing fluid to and from said hydraulic cylinder; and a second control means operatively connected to said control valve and responsive to the movement of said cross conveyor irrespective of direction for actuating said control valve.

9. A hydraulic control system for controlling tier separation and single bale unloading in a single bale unloading bale wagon, as recited in claim 8, wherein said second control means for actuating said control valve comprises: a pair of laterally spaced paddles carried by said cross conveyors; an actuator plate moveably mounted adjacent said cross conveyor and biased to assume a first position in the path of said paddles and moveable to a second position in response to engagement of said paddles therewith; and a connecting link interconnecting said actuator plate with said control valve for actuating said control valve as said actuator plate moves between said first and second positions.

10. A hydraulic control system for controlling tier separation and single bale unloading in a single bale unloading wagon, as recited in claim 9, wherein said second control means further includes a cam following mechanism also operative to actuate said control valve, and a cam operatively responsive to the movement of said bale separating hooks for engaging said cam following mechanism and actuating said control valve.

11. A hydraulic control system, as recited in claim 10, wherein said cross conveyor drive means includes an orbit motor operative to drive said cross conveyor and wherein said first control means for said cross conveyor drive means includes a pivotally mounted manually actuated control handle, an orbit motor control valve, and a linkage structure interconnecting said control handle and said orbit motor control valve and wherein said linkage structure is particularly adaptable to be selectively connected at either side of the pivot point of said control handle, whereby fluid may be directed into either side of said orbit motor by selectively connecting the linkage structure to the particular side of the pivot point of the control handle.

* * * * *